C. S. LOCKWOOD.
ANTIFRICTION CAGE FOR ROLLER BEARING ROLLS.
APPLICATION FILED MAY 19, 1909.
961,303.
Patented June 14, 1910.
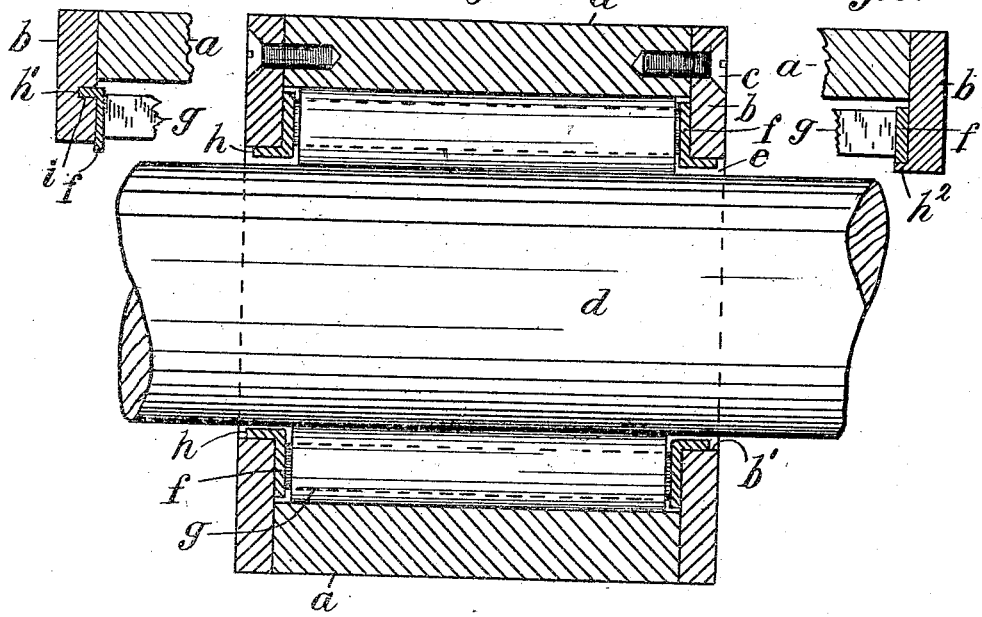
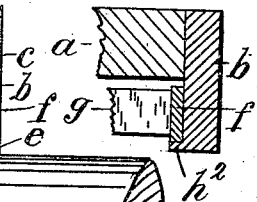
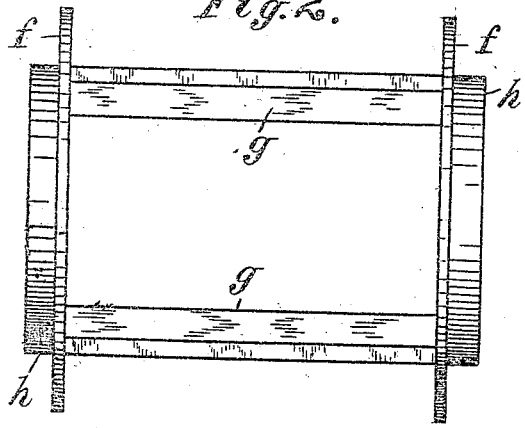
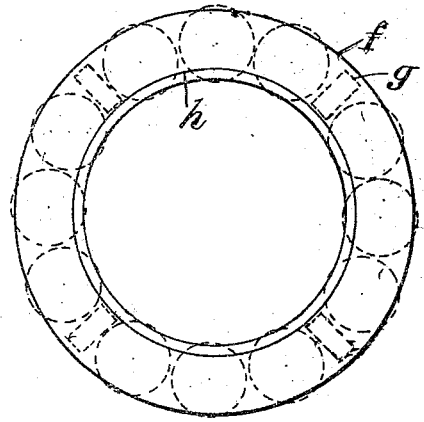
Witnesses:
L. Lee.
J. W. Greenbaum.
Inventor.
Charles S. Lockwood, per
Thomas S. Crane, Atty.

UNITED STATES PATENT OFFICE.

CHARLES S. LOCKWOOD, OF NEWARK, NEW JERSEY, ASSIGNOR TO HYATT ROLLER BEARING COMPANY, OF HARRISON, NEW JERSEY, A CORPORATION OF NEW JERSEY.

ANTIFRICTION-CAGE FOR ROLLER-BEARING ROLLS.

961,303.   Specification of Letters Patent.   Patented June 14, 1910.

Application filed May 19, 1909. Serial No. 497,091.

*To all whom it may concern:*

Be it known that I, CHARLES S. LOCKWOOD, a citizen of the United States, residing at 289 Market street, Newark, county of Essex, and State of New Jersey, have invented certain new and useful Improvements in Antifriction-Cages for Roller-Bearing Rolls, fully described and represented in the following specification and the accompanying drawings, forming a part of the same.

This invention relates to an improved means of supporting a movable cage within a roller-bearing, so as to guide the rolls in their movement with as little frictional resistance as possible, from the cage itself.

The object is to hold the cage from contact with either the shaft or the casing, upon either of which dirt is liable to adhere and increase the friction and resistance to the movement of the same; and this object is attained by supporting the cage wholly upon the flanges fixed at the ends of the casing to retain the rolls therein. A rigid cage is necessary for this operation, so as to hold both ends in a concentric path upon the end flanges, and the cage may be engaged with said flanges by a collar upon either of the parts, fitted to an annular recess in the other part.

The invention will be understood by reference to the annexed drawing, in which—

Figure 1 is a side view of a bearing embodying the improvement with the parts in section at the center line where hatched, the cage having a circular collar projected from each of its heads. Fig. 2 is a side view of such cage showing the collars upon the heads; Fig. 3 is an end view of the cage with dotted lines indicating the rolls adapted to operate therewith; Fig. 4 shows one corner of the casing in section with the collar upon the outer edge of the cage-head; and Fig. 5 is an analogous view showing the collar upon the flange at the end of the casing instead of upon the cage.

$a$ designates the casing, $b$ the end flanges secured thereon by screws $c$ and formed with central bore $b'$ larger than the shaft $d$ to leave an annular recess $e$ between each of the flanges and the shaft. The heads $f$ of the cage are shown connected by tie-bars $g$, and in Figs. 1, 2 and 3 provided with a collar $h$ projected outwardly from the inner edge of the head and fitted within the recess $e$.

The collars are proportioned to fit movably in the bores $b'$ of the flanges which therefore guide the cage concentrically with the shaft, but prevent it from moving inward or outward, thus holding it from contact with the shaft or casing. The rigidity of the cage keeps both collars in the proper relation to the recesses.

Fig. 4 shows a collar $h'$ formed upon the outer edge of the head instead of upon the inner edge, as in Fig. 1, the flange $b$ having a groove or annular recess $i$ formed therein to receive such exterior collar. Such engagement of the cage-head with the end flange of the casing has the same effect as the engagement shown in Fig. 1.

Fig. 5 shows the head $f$ without any collar, and the flange $b$ formed with a collar $h^2$ adapted to project within the head and to fit the same loosely enough for the heads at opposite ends of the cage to ride upon the two collars, which supports and guides the cage the same as already described.

It is common to use lubricants in roller-bearings, and it will be observed that the parts which form the engagement of the cage with the heads of the casing are in such a position as to be automatically lubricated, so that the collar which guides the cage is enabled to do so with a minimum of frictional resistance.

Having thus set forth the nature of the invention what is claimed herein is:

1. The combination, with a roller bearing having a casing with bore to support the rolls and a set of rolls to support the shaft, of flanges fixed upon the ends of the casing and inclosing the rolls, and a roll-cage supported movably upon the said flanges and thereby held from contact with the shaft or the bore of the casing.

2. The combination, with the roller bearing having a casing with bore to support the rolls and a set of rolls to support the shaft, of flanges fixed upon the ends of the casing each having an annular recess between the same and the shaft, and a roll-cage having collars at opposite ends fitted to the flanges and supported movably in such annular recesses and thereby held from contact with the shaft and bore of the casing.

In testimony whereof I have hereunto set my hand in the presence of two subscribing witnesses.

CHARLES S. LOCKWOOD.

Witnesses:
 ALFRED V. PLOVERLY,
 H. E. SAUL.